(12) United States Patent
Cui et al.

(10) Patent No.: US 11,159,990 B2
(45) Date of Patent: Oct. 26, 2021

(54) MICROSERVICES COORDINATOR FOR 5G OR OTHER NEXT GENERATION NETWORK

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Paul Smith, Jr., Heath, TX (US); Sangar Dowlatkhah, Cedar Hill, TX (US)

(73) Assignees: AT&T Intellectual Property I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 27 days.

(21) Appl. No.: 16/666,814

(22) Filed: Oct. 29, 2019

(65) Prior Publication Data
US 2021/0127306 A1 Apr. 29, 2021

(51) Int. Cl.
| | |
|---|---|
| H04W 4/00 | (2018.01) |
| H04W 28/24 | (2009.01) |
| H04W 28/02 | (2009.01) |
| H04W 28/08 | (2009.01) |
| H04W 28/10 | (2009.01) |
| H04W 48/18 | (2009.01) |
| H04W 28/06 | (2009.01) |

(52) U.S. Cl.
CPC ....... *H04W 28/24* (2013.01); *H04W 28/0268* (2013.01); *H04W 28/06* (2013.01); *H04W 28/08* (2013.01); *H04W 28/10* (2013.01); *H04W 48/18* (2013.01)

(58) Field of Classification Search
None
See application file for complete search history.

(56) References Cited

U.S. PATENT DOCUMENTS

| | | | |
|---|---|---|---|
| 9,716,617 B1 | 7/2017 | Ahuja et al. | |
| 2014/0086103 A1 | 3/2014 | Venkatachalam | |
| 2017/0257440 A1* | 9/2017 | Barton | H04L 67/26 |
| 2017/0279910 A1* | 9/2017 | Maria | H04L 43/0811 |
| 2018/0081983 A1* | 3/2018 | Carru | H04L 63/0815 |
| 2019/0140903 A1* | 5/2019 | Ahuja | H04L 67/1002 |
| 2019/0238636 A1* | 8/2019 | Li | H04L 67/1095 |
| 2019/0320038 A1* | 10/2019 | Walsh | G06F 9/546 |
| 2020/0195528 A1* | 6/2020 | Barton | H04L 47/2425 |
| 2020/0366697 A1* | 11/2020 | Vittal | H04L 63/10 |
| 2020/0366733 A1* | 11/2020 | Parvataneni | H04L 67/16 |
| 2020/0366752 A1* | 11/2020 | White | H04L 67/327 |

(Continued)

OTHER PUBLICATIONS

Non-Final Office action received for U.S. Appl. No. 16/699,999 dated Oct. 27, 2020,19 Pages.

*Primary Examiner* — Elisabeth Benoit Magloire
(74) *Attorney, Agent, or Firm* — Amin, Turocy & Watson, LLP

(57) ABSTRACT

A microservices coordinator function can be utilized to apply dynamic policy changes for microservices. For example, based on outlined service provider policies, user equipment state data, and/or network state data, the microservices coordinator function can determine which microservices to use and what order to use the microservices to increase a performance of the network. The microservices coordinator can perform conflict resolution based on how network traffic should be treated in certain scenarios.

20 Claims, 10 Drawing Sheets

(56) References Cited

U.S. PATENT DOCUMENTS

2020/0366756 A1* 11/2020 Vittal ..................... H04L 67/36
2020/0366758 A1* 11/2020 Chauhan ............. H04L 43/0817
2020/0412596 A1* 12/2020 Cherunni ................ H04L 41/04

* cited by examiner

MICROSERVICES COORDINATOR FOR 5G OR OTHER NEXT GENERATION NETWORK

TECHNICAL FIELD

This disclosure relates generally to facilitating an intelligent policy control engine. For example, this disclosure relates to facilitating a microservices coordinator for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to a microservices coordinator is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
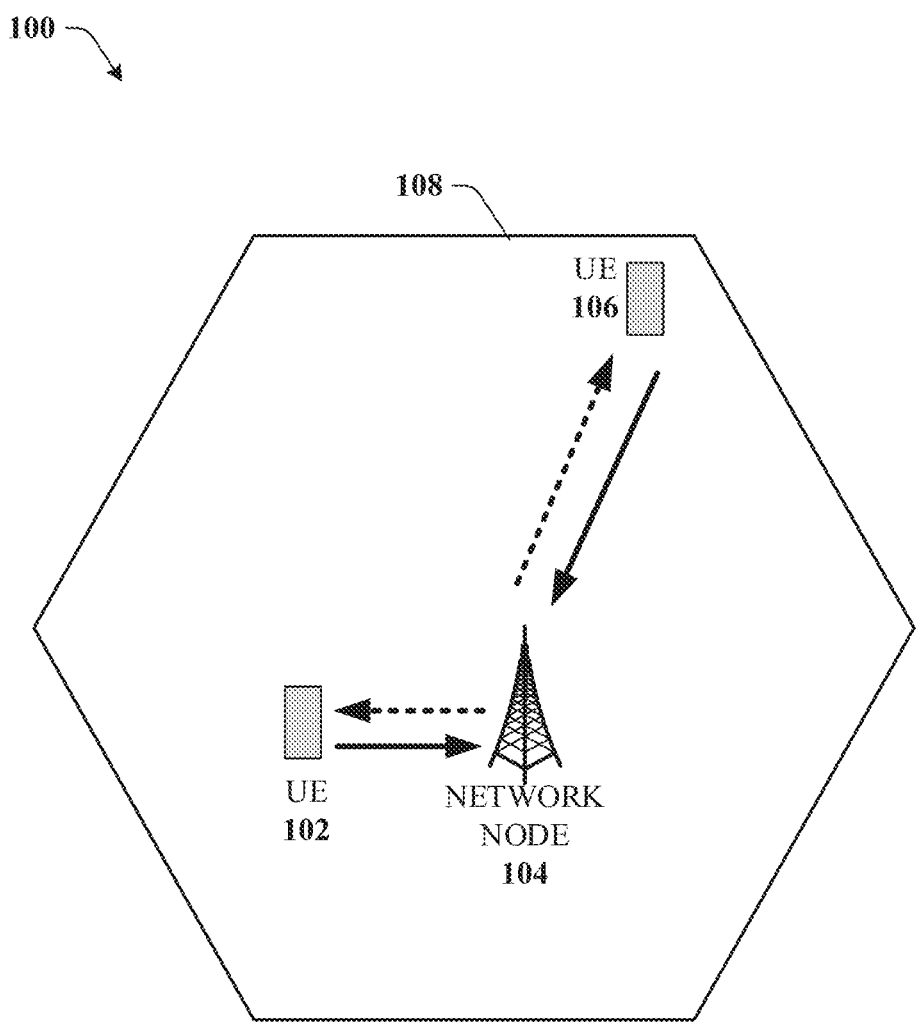
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to a microservices coordinator for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.12 technology. Additionally, substantially all aspects disclosed herein can be exploited in legacy telecommunication technologies.

Described herein are systems, methods, articles of manufacture, and other embodiments or implementations that can facilitate a microservices coordinator for a 5G network. Facilitating a microservices coordinator for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

An SDN enabled open eco-system with high modularity and flexibility can support an entirely new generation of applications. An open eco-system and platform can allow a broader community to contribute and innovate. An open radio access network (O-RAN) can define the architecture and the standards including a radio access network intelligent controller (RIC) to provide an extensible platform to support various radio access network (RAN) control functions, coupled with operator (e.g., service provider) intent policies, and real time data from the network and users to enable more granular RAN control. These RAN control functions aim to solve different problems, (e.g., load balancing to balance the load amongst cells, antenna tile to change the coverage of a cell to improve the cell edge user experience, etc.). Currently, control features are based on pre-defined rules/policies at a cell or group of cell level. However, a micro-service coordinator (MSCo), which takes the input from the operator policy, the real time network data, and/or artificial intelligence (AI)/machine learning (ML) can generate decisions including trigger conditions (e.g. types of services, network conditions, radio frequencies (RF), physical locations, and/or UE conditions and capabilities, etc.) and corresponding actions, (e.g., what RAN control function can be implemented as micro-services, or xApps) to trigger and what micro-services/actions will have priorities over others, based on the various inputs.

RIC functions can be implemented by micro-services. An enhanced RIC framework can comprise a micro-service coordinator (MSCo). The MSCo can perform the coordination and conflict resolution of the RIC functions. Based on policies, network state, and/or UE states, the MSCo can dynamically create the composition of the RIC microservices to meet service requests. The policy can specify the intent of how the traffic should be treated. The MSCo can receive inputs from the real time network data and AI/ML results to establish decisions including trigger conditions (e.g. types of services, network conditions, RF and/or physical locations, UE conditions and capabilities, etc.), and actions (e.g., what signatures RIC micro-services can trigger, and what signatures/actions can have priorities over others, based on the input from the policy). Thus, tailored actions can be provided based on different types of services, slices, locations, and users to prevent a violation of a service level agreement (SLA). For example, the operator (e.g., service provider) can provide a dynamic policy to the MSCo on the RIC, via A1 interface, regarding how traffic types (e.g., first respondent user versus voice, high speed data, video traffic, large downloads, etc.). For example, the policy operator can upload a slice profile of a URLLC with a desired amount of network resource (e.g., RAN physical resource blocks (PRBs) that can be used to carry user traffic).

The MSCo can maintain updated network and per UE per flow information and conditions, as well as the list of the micro-services corresponding to the list of the RAN control features and any other network optimization functions. The MSCo can dynamically make the decision, including trigger conditions and the sequence of actions to take based on the input from the policy, the network conditions, and/or the UE conditions. The trigger condition categories can comprise: network efficiency improvement versus cost savings, issue remediation (e.g., the SLA is predicted to be violated). A root cause can be one or more of a combination of: coverage (e.g., outage, coverage hole, uplink (UL)/downlink (DL) imbalance), interference (e.g., overlapping, overshooting, external interference, chronical site issue), traffic distribution (e.g., imbalanced layers, UE high or low mobility), and/or congestion (e.g., high utilization of user plane or control plane resources). The actions can comprise what signature (e.g., UL/DL power control, tilting, full dimension (FD)-MIMO/beam forming, mobility as a service (MaaS), traffic steering/load balancing, carrier aggregation optimization (e.g., combining carriers to allocate resources across a device), dynamic QoS, throughput capping, scheduler priority adjustment, etc.

Upon detecting the trigger conditions, the MSCo can dynamically compose and trigger the micro-services with the right sequence of micro-service features to optimize network performance for a given service, location, group of cells, a slice, group of UEs, or even a single UE. For instance, when a load condition is detected, some non real-time traffic can be buffered to prioritize real time video traffic, and when the load continues to rise above a 2nd threshold, a bit rate cap can be applied. At the run time, the MSCo can dynamically make the decision regarding the proposed actions, changes to the actions, or do nothing based on the data analytics and machine learning. The RIC platform can then communicate with the RAN (e.g., via an open E2 interface) for guidance as the results of the MSCo decision are executed according to the corresponding microservices. Meanwhile, a DA/ML engine can continue to monitor the network performance and provide feedback to the MSCo regarding how effective the proposed actions are. The MSCo can dynamically refine the decision based on the feedback from the DA/ML and also provide the feedback to the operator policy engine, which can also take the learning and refine the policies.

It should also be noted that an artificial intelligence (AI) component can facilitate automating one or more features in accordance with the disclosed aspects. A memory and a processor as well as other components can include functionality with regard to the figures. The disclosed aspects in connection with the microservices coordinator can employ various AI-based schemes for carrying out various aspects thereof. For example, a process for generating one or more trigger events, modifying a sequence as a result of the one or more trigger events, and allocating one or more microservices, and so forth, can be facilitated with an example automatic classifier system and process. In another example, a process for penalizing one microservice while preferring another microservice can be facilitated with the example automatic classifier system and process.

An example classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that can be automatically performed. In the case of communication systems, for example, attributes can be a frequency band and a wireless technology, and the classes can be an output power reduction value. In another example, the attributes can be a frequency band, a wireless technology, and the presence of an object and the classes can be an output power reduction value.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing mobile device usage as it relates to triggering events, observing network frequency/technology, receiving extrinsic information, and so on). For example, SVMs can be configured via a learning or training phase within a classifier constructor and feature selection module. Thus, the classifier(s) can be used to automatically learn and perform a number of functions, including but not limited to modifying a microservice sequence, modifying one or more triggers, and so forth. The criteria can include, but is not limited to, predefined values, frequency attenuation tables or other parameters, service provider preferences and/or policies, and so on.

In one embodiment, described herein is a method comprising receiving, by a wireless network device comprising a processor, policy data representative of a policy associated with a wireless network. The method can comprise receiving, by the wireless network device from a mobile device, state data representative of a state of the mobile device. Additionally, as a function of the policy data and the state data, the method can comprise generating, by the wireless network device, a trigger condition to trigger functionality associated with a microservice. Furthermore, subsequent to the generating the trigger condition, the method can comprise determining, by the wireless network device, that the trigger condition has been satisfied.

According to another embodiment, a system can facilitate, the receiving policy data, representative of a policy, from a wireless network device of a wireless network. The operations can comprise receiving from a mobile device of the wireless network, state data representative of a state of the mobile device. Based on the policy data and the state data, the system can comprise generating a trigger condition to trigger an action associated with applying a microservice to the mobile device. Furthermore, in response to the generating the trigger condition, the system operations can comprise determining that the trigger condition has been satisfied.

According to yet another embodiment, described herein is a machine-readable storage medium that can perform the operations comprising receiving policy data representative of a service level agreement associated with a wireless network. The machine-readable storage medium can perform the operations comprising receiving, from a mobile device, state data representative of a current state of the mobile device. In response to the receiving the policy data and the state data, the machine-readable storage medium can perform the operations comprising generating threshold data representative of a threshold associated with a distribution of a microservice. Additionally, in response to the generating the threshold data, the machine-readable storage medium can perform the operations comprising determining that the threshold has been satisfied. Furthermore, in response to the determining that the threshold has been satisfied, the machine-readable storage medium can perform the operations comprising distributing the microservice to the mobile device.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud-based networks, and the like. For example, in at least one implementation, system 100 can be or include a large-scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
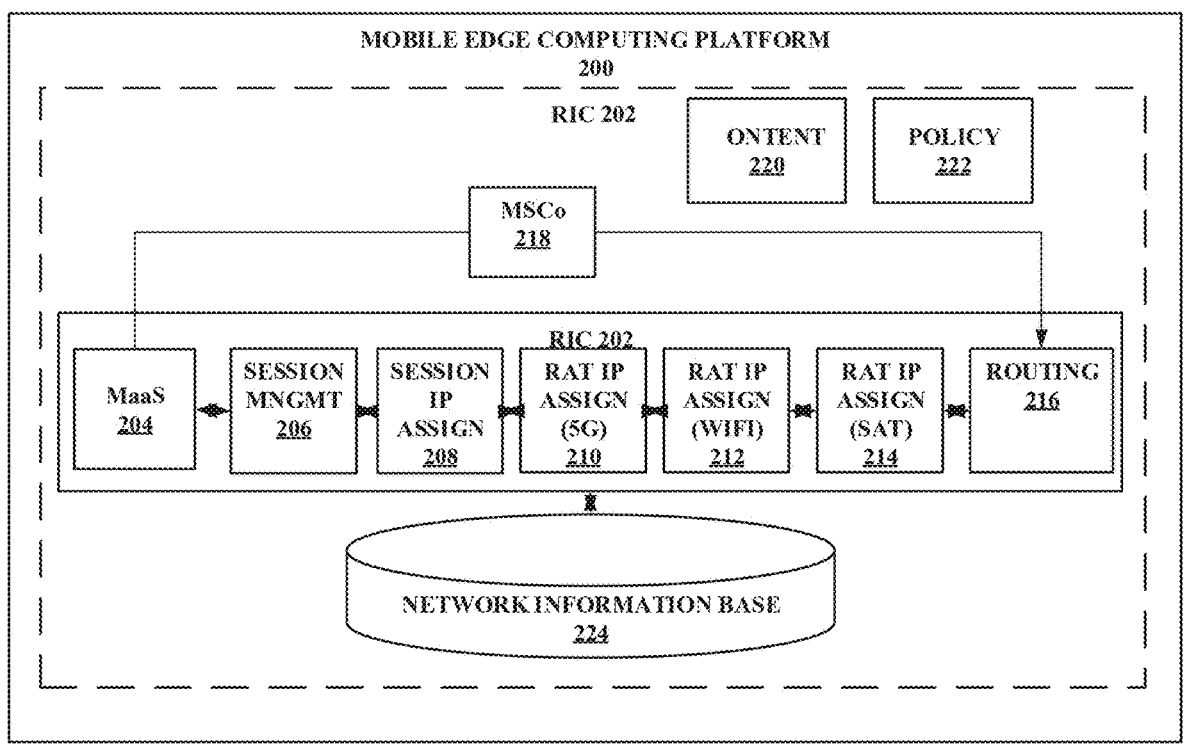
FIG. 2 illustrates an example schematic system block diagram of a mobile edge computing platform according to one or more embodiments.

Referring now to FIG. 2, illustrated is an example schematic system block diagram of a mobile edge computing platform 200. A radio access network intelligent controller (RIC) 202, found within a mobile edge computing (MEC) platform 200, can comprise several microservices to increase system efficiencies. For example, the mobility as a service (MaaS) function 204 can determine how to treat traffic based on a mobility state (i.e., moving, non-moving) of a UE 102. The session management function 206 can maintain session continuity regardless of where the UE 102 is located within the network. For example, if a user is talking, then the session management function 206 can ensure that the session is not dropped. However, if the user is checking an email, then session continuity does not need to be maintained to receive the email. The session IP assignment function 208, can be used to maintain session continuity as well. Although a physical IP address can be changed, the session layer of the IP address cannot be changed. Thus, the RIC 202 can comprise a microservice that provides the session IP address assignment. A radio access technology (RAT) IP assignment function 210 is for a physical layer IP that can be used for mobility management. If the UE 102 connects to Wi-Fi (e.g., RAT IP Assign WiFi 212) and/or satellite (e.g., RAT IP Assign Sat 214, then there can be a corresponding IP address assigned to the UE 102. However, no matter which technology or the mobility status of the UE 102, the packet data will still have to be routed (e.g., tunnel-based routing, IP connection-based routing, etc.) via the routing function 216. The network information base 224 can maintain the state of the RAN (whether the network is congested or not) and the state for each device (e.g., the radio link conditions of each UE 102). The microservices coordinator (MSCo) 218 can determine which microservices should be utilized under certain conditions and in what order (e.g., sequence) the microservices should be executed. Within the MEC platform 200, local content 220 can be hosted to improve the performance, reduce latency, and reduce the transport time.

The MSCo 218 can receive inputs from the policy function 222 to provide guidance on what the MSCo 218 should do based on certain triggers. The MSCo 218 can have access to the network state, the UE 102 state, and an inventory of microservices. There are various network resource management functions that can address specific aspects of the network (e.g., load balancing functions, handover functions, antenna function, power control functions, etc.). The MSCo 218 can provide dynamic allocation of microservices instead of predefined decisions. Thus, the MSCo 218 can dynamically take an input from the policy function 222, the network state, and/or the UE 102 state and determine which trigger conditions to apply to allocation of microservices and in what order the microservices should be allocated. This data can then be communicated to the RIC 202.

Figure 3:
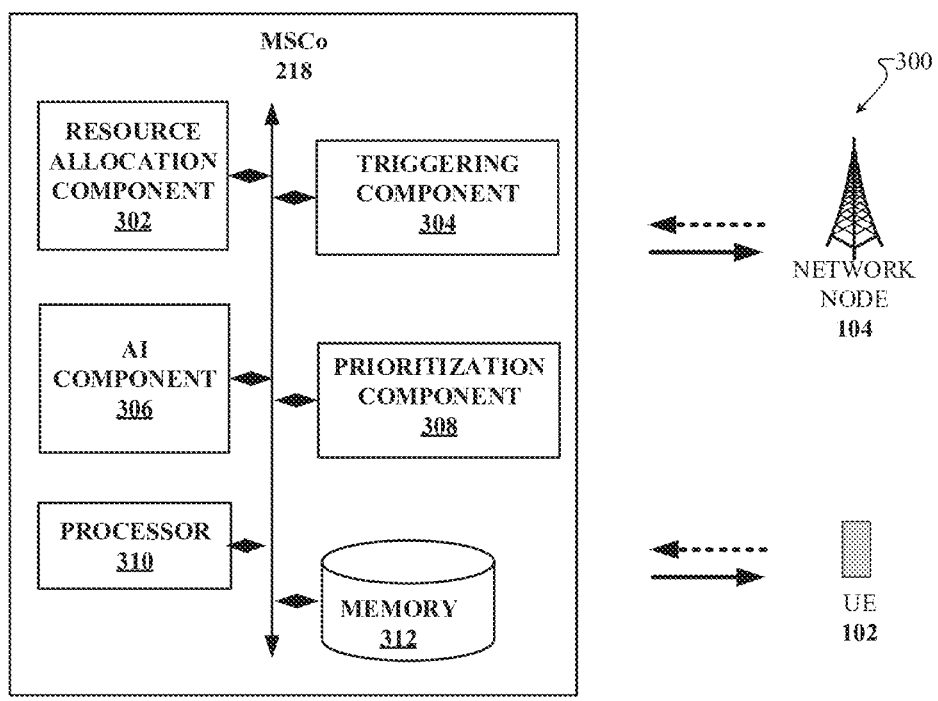
FIG. 3 illustrates an example schematic system block diagram of the MSCo according to one or more embodiments.

Referring now to FIG. 3, illustrated is an example schematic system block diagram of the MSCo 218. As depicted in FIG. 3, the MSCo 218 can comprise sub-components (e.g., resource allocation component 302, triggering component 304, AI component 306, and prioritization component 308), processor 310 and memory 312 can bi-directionally communicate with each other. It should also be noted that in alternative embodiments that other components including, but not limited to the sub-components, processor 310, and/or memory 312, can be external to the MSCo 218. Aspects of the processor 310 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described by the MSCo 218. In an aspect, the MSCo 218 can also include memory 312 that stores computer executable components and instructions.

The triggering component 304 can receive data associated with triggers for specific microservices to address specific network-based scenarios. For example, if a network load exceeds a certain threshold, then that threshold can be the trigger to invoke a load balancing microservice. Based on dynamic criteria, the triggering component 304 can trigger additional operations by the RIC 202. Consequently, the triggering component 304 can initiate resource allocation by the resource allocation component 302. The resource allocation component 302 can pull resources from other mobile devices and/or instantiate new resources in response to a triggering event. Network resources such as bandwidth, network capacity, beam patterns, beam pattern functions, workload assignments, etc., can be divided between UEs based on a priority associated with the UE in relation to triggering event. For example, if the UE 102 is requesting emergency services and a second mobile device is requesting entertainment services, then the UE 102 can receive the highest priority (based on the state of the UE) via the prioritization component 308 because the UE 102 is requesting resources to facilitate mitigation of an emergency situation.

Priority assignments can be based on the type of UE 102, type of microservice, geographic location, UE 102 power, time, a type of emergency (e.g., a fire versus a car accident, etc.), number of concurrent emergencies, location, etc. Thus, based on the priority assigned by the prioritization component 308, the network resources can be allocated to the UE 102, by the resource allocation component 302, accordingly. Additionally, the AI component 306 can learn from previous patterns associated with microservice coordination, priorities assigned to specific microservices, and/or scenarios and modify microservice allocation based on the aforementioned factors and/or historical patterns analyzed by the AI component 306.

Figure 4:
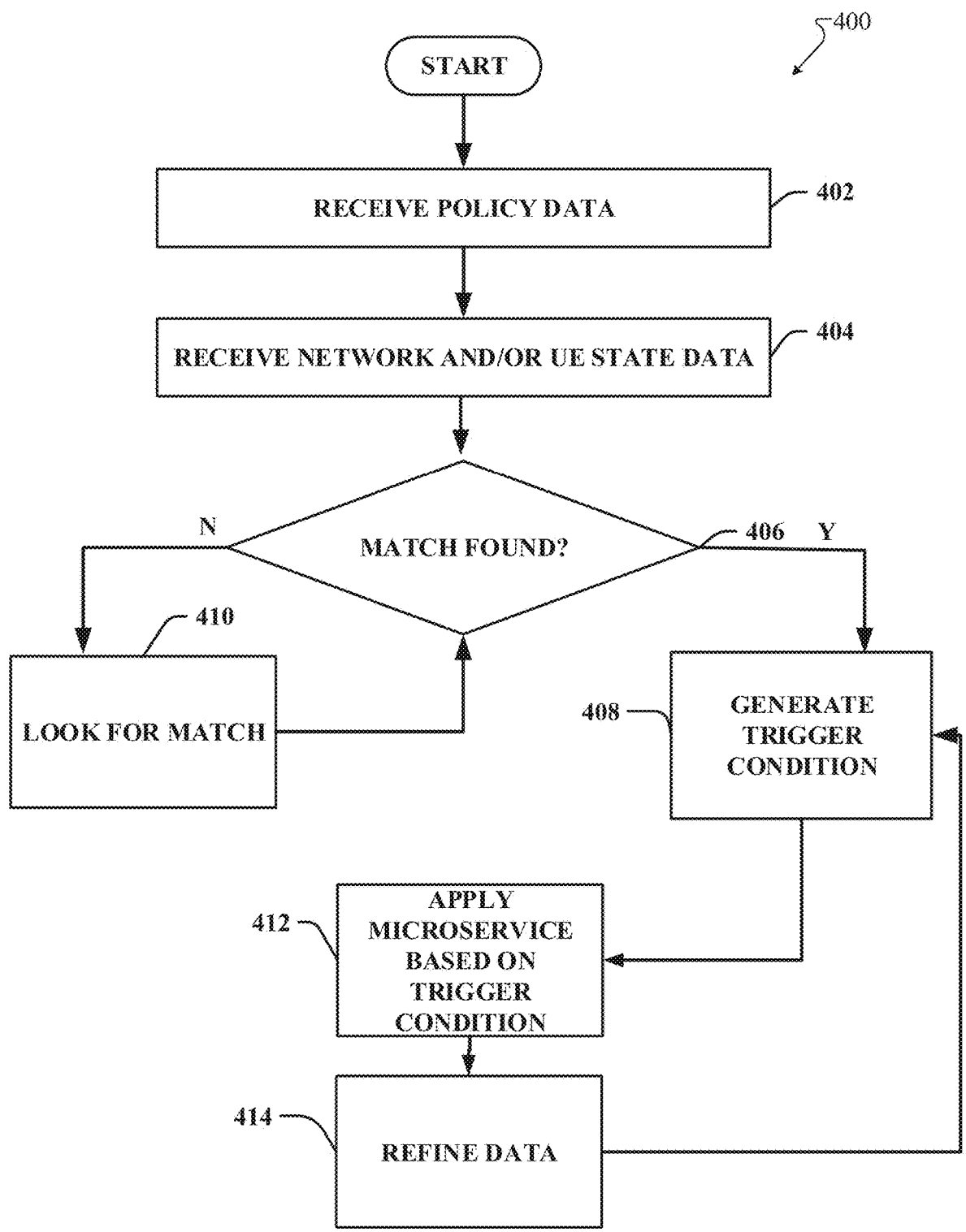
FIG. 4 illustrates an example schematic system flow diagram of microservices coordination according to one or more embodiments.

Referring now to FIG. 4, illustrated is an example schematic system flow diagram 400 of microservices coordination. At block 402, the MSCo 218 can receive policy data from the policy function 222. The policy data can be generated by a service provider to assist the MSCo 218 in allocating microservices for specific network-based scenarios. At block 404, the MSCo 218 can receive network data from the network node 104 and/or UE data from the UE 102. At decision point 406, the MSCo 218 can determine if there is a match found between the policy data and the UE and/or network states. If there is a match found, then the MSCo 218 can generate a trigger condition to be applied to the microservices and distribution thereof. However, if there is no match found at decision point 406, then the MSCo 218 can recursively check for matches at the decision point 406 until a match is found. After the trigger is generated and satisfied, then a microservice and/or sequence modification can be applied at block 412. Based on the outcome (e.g., increase, static, or decrease of efficiency) of this application, the artificial intelligence component 306 can refine the data at block 414 to modify the trigger condition at block 408.

Figure 5:
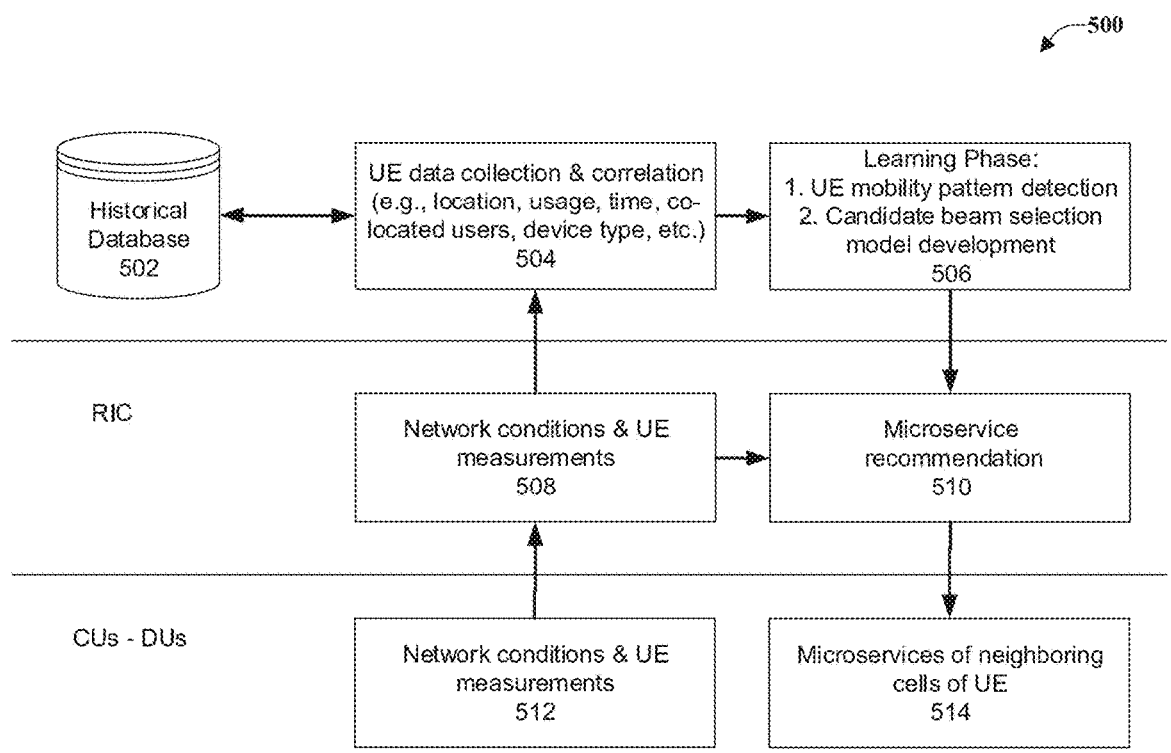
FIG. 5 illustrates an example flow diagram of a closed loop control system according to one or more embodiments.

Referring now to FIG. 5, illustrated is an example flow diagram of a closed loop control system 500. A network management platform database 502 can send and receive data, associated with UEs 102, 104, to block 504 where the UE data can be collected and/or correlated by a collection and correlation component. For example, location data can be correlated to time data associated with a specific UE (e.g., UE 102 is in/near macro-cell 108f at 8 am most mornings). The UE data can comprise UE state data (collection data, correlation data, usage data, device type data, etc.). The UE data can be sent to the UE data collection and correlation component at block 504 from a network conditions and UE measurement component within the RIC at block 508. Once the UE data collection and correlation component receives the UE data and correlates the UE data, the UE data collection and correlation component can send the UE data and correlation data to a learning component at block 506. The learning component can utilize AI or machine learning (ML) to detect UE mobility and network patterns and modify application of a microservice at block 510.

The network conditions and UE measurement component of centralized units (CUs) and/or distributed units (DUs) at block 512 can send the network condition and measurement data to the network conditions and UE measurement component within the RIC at block 508. The MSCO 218 can then use the network measurements to determine which microservices are candidate microservices and then send the candidate microservices to the CUs and/or DUs at block 510. Microservices of neighboring cells of the UE 102 can be received by the CUs and/or DUs at block 514.

Figure 6:
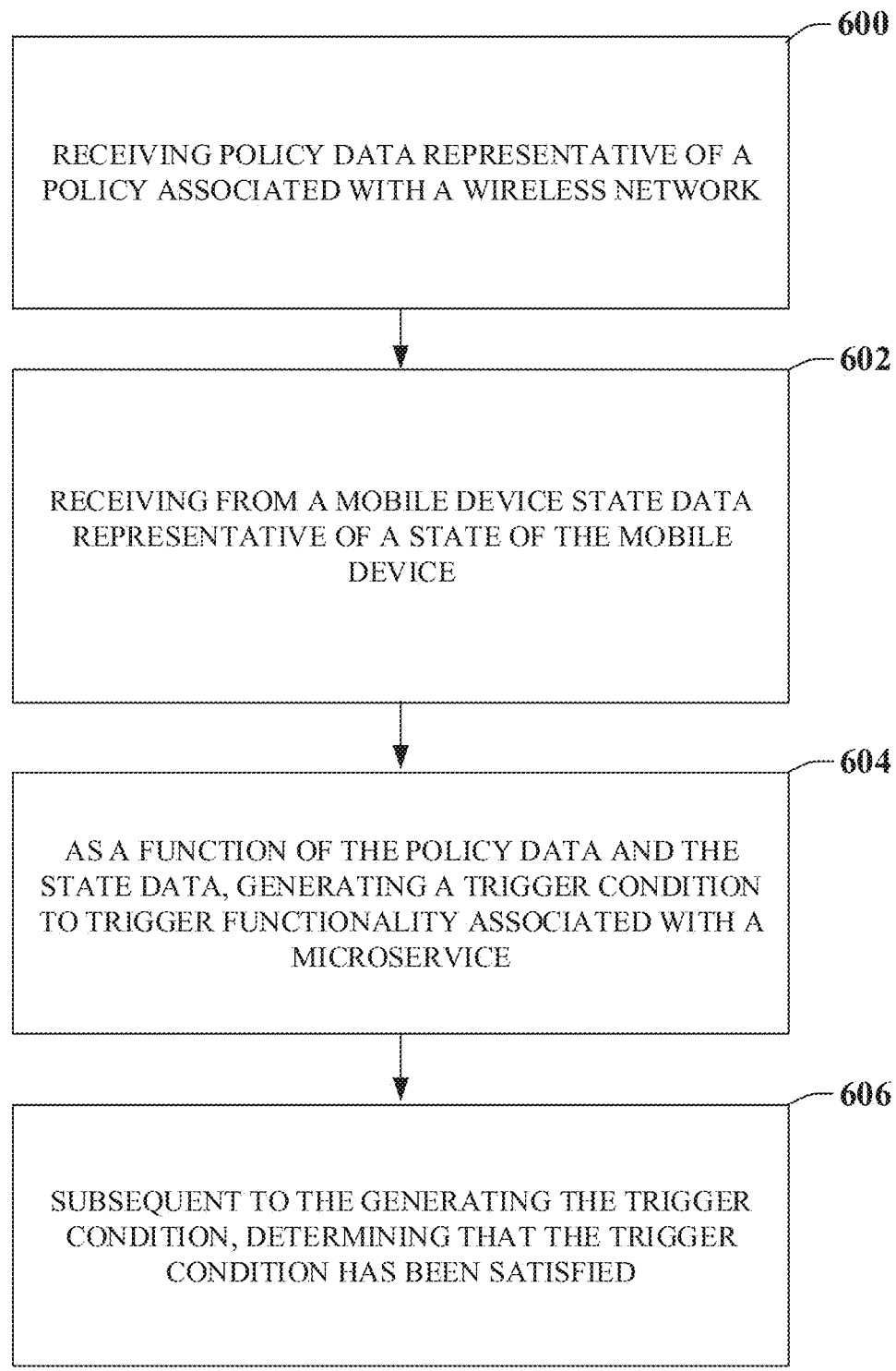
FIG. 6 illustrates an example flow diagram for a method for facilitating microservices coordination for a 5G network according to one or more embodiments.

Referring now to FIG. 6, illustrated is an example flow diagram for facilitating microservices coordination for a 5G network according to one or more embodiments. At element 600, the method can comprise receiving policy data (e.g. from the policy function 222) representative of a policy associated with a wireless network. At element 602, the method can comprise receiving, from a mobile device (e.g., UE 102), state data representative of a state of the mobile device (e.g., UE 102). Additionally, as a function of the policy data and the state data, at element 604, the method can comprise generating (e.g., via the MSCo 218) a trigger condition to trigger functionality associated with a microservice. Furthermore, subsequent to the generating the trigger condition, at element 606, the method can comprise determining (e.g., via the MSCo 218) that the trigger condition has been satisfied.

Figure 7:
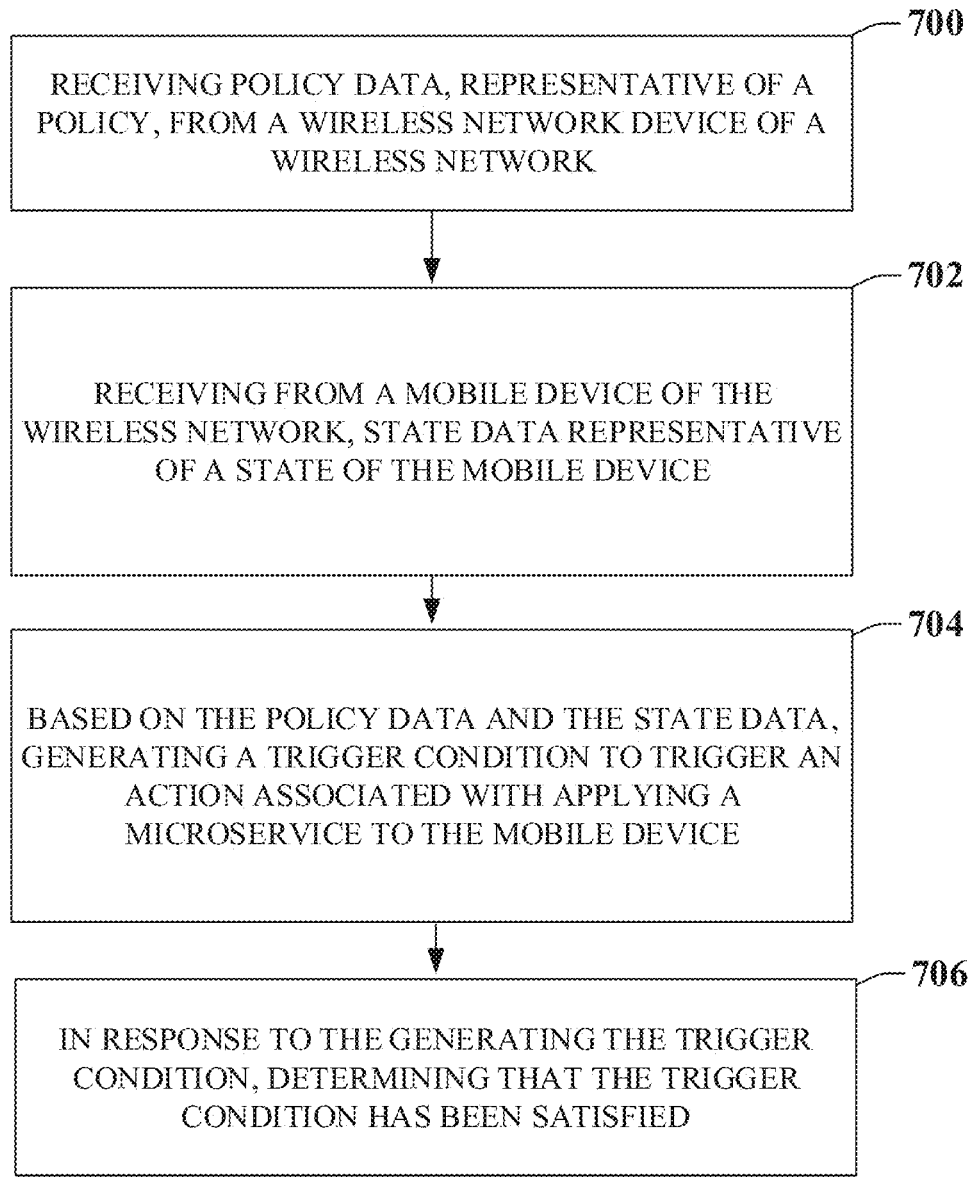
FIG. 7 illustrates an example flow diagram for a machine-readable for facilitating microservices coordination for a 5G network according to one or more embodiments.

Referring now to FIG. 7, illustrated is an example flow diagram for facilitating microservices coordination for a 5G network according to one or more embodiments. At element 700, the system can facilitate receiving policy data (e.g., via the MSCo 218), representative of a policy, from a wireless network device of a wireless network. At element 702, the system operations can comprise receiving (e.g., via the MSCo 218) from a mobile device of the wireless network, state data representative of a state of the mobile device (e.g., UE 102). Based on the policy data and the state data, at element 704, the system can comprise generating (e.g., via the MSCo 218) a trigger condition to trigger an action associated with applying a microservice to the mobile device (e.g., UE 102). Furthermore, in response to the generating the trigger condition, the system operations can comprise determining (e.g., via the MSCo 218) that the trigger condition has been satisfied at element 706.

Figure 8:
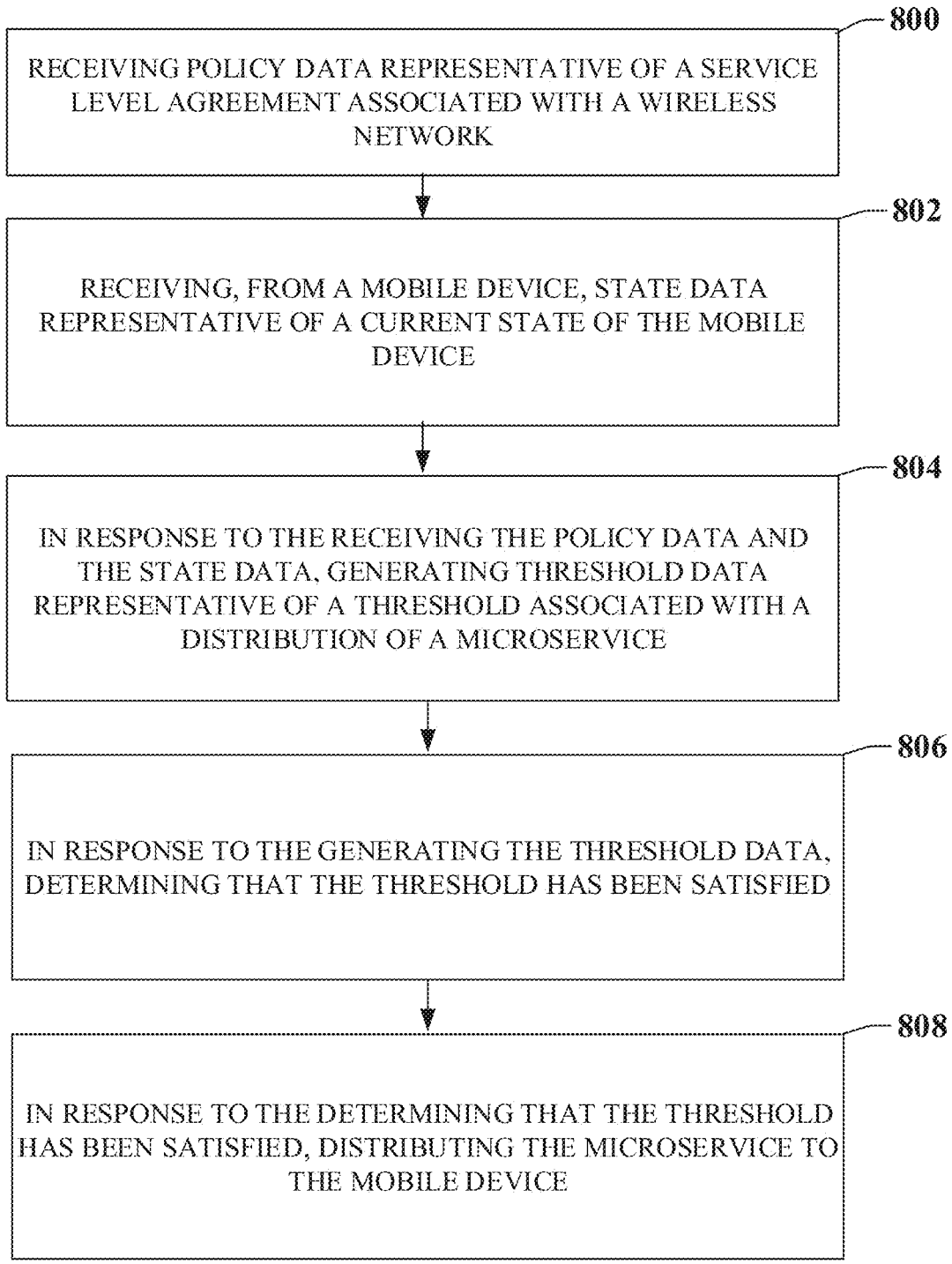
FIG. 8 illustrates an example flow diagram for a system for facilitating microservices coordination for a 5G network according to one or more embodiments.

Referring now to FIG. 8, illustrated is an example flow diagram for a machine-readable medium for facilitating microservices coordination for a 5G network according to one or more embodiments. At element 800, the machine-readable storage medium can perform the operations comprising receiving (e.g., via the MSCo 218) policy data representative of a service level agreement associated with a wireless network. At element 802, the machine-readable storage medium can perform the operations comprising receiving (e.g., via the MSCo 218), from a mobile device (e.g., UE 102), state data representative of a current state of the mobile device. In response to the receiving the policy data and the state data, at element 804, the machine-readable storage medium can perform the operations comprising generating (e.g., via the MSCo 218) threshold data representative of a threshold associated with a distribution of a microservice. Additionally, at element 806, in response to the generating the threshold data, the machine-readable storage medium can perform the operations comprising determining (e.g., via the MSCo 218) that the threshold has been satisfied. Furthermore, in response to the determining that the threshold has been satisfied, the machine-readable storage medium can perform the operations comprising distributing (e.g., via the MSCo 218) the microservice to the mobile device (e.g., UE 102) at element 808.

Figure 9:
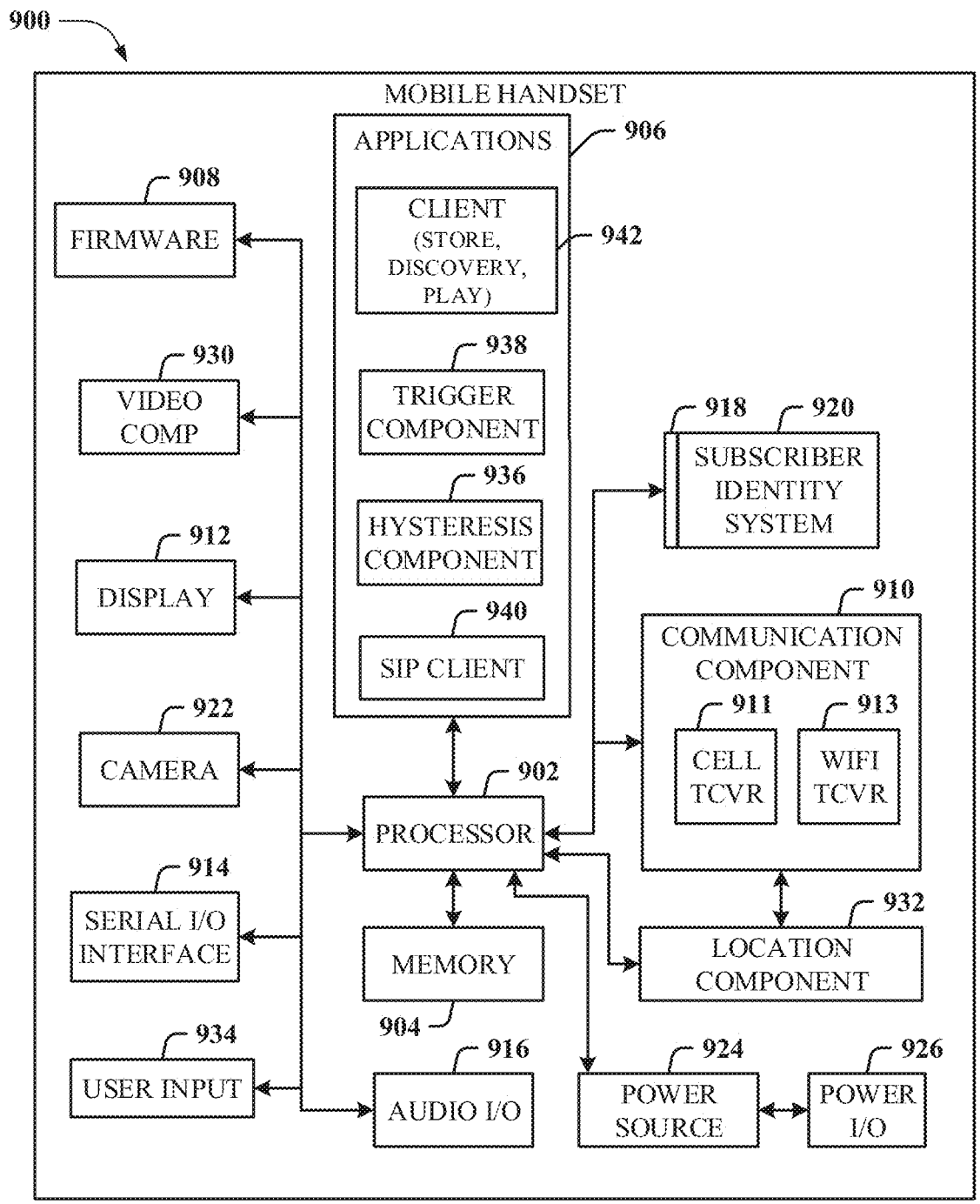
FIG. 9 illustrates an example block diagram of an example mobile handset operable to engage in a system architecture that facilitates secure wireless communication according to one or more embodiments described herein.

Referring now to FIG. 9, illustrated is a schematic block diagram of an exemplary end-user device such as a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
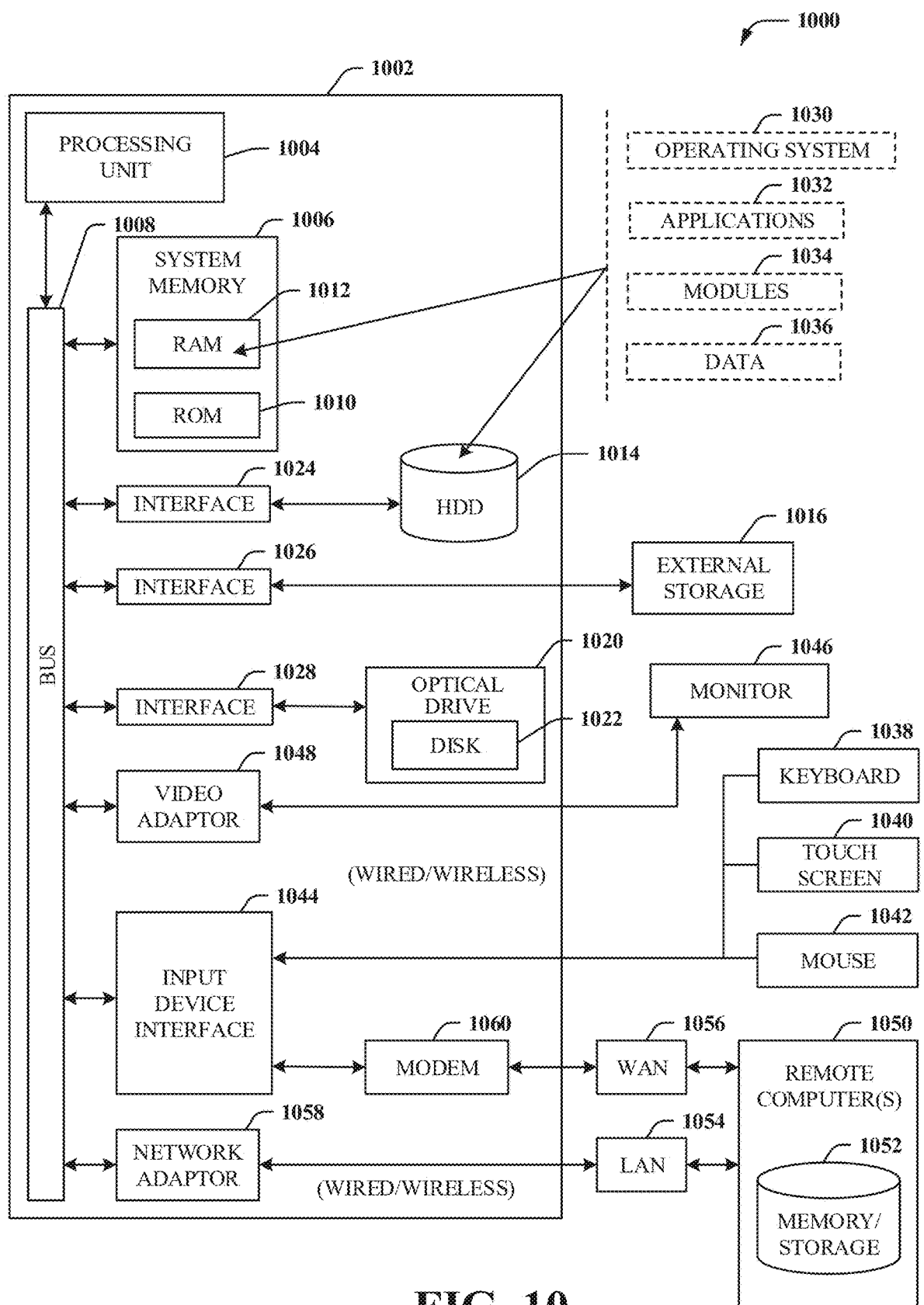
FIG. 10 illustrates an example block diagram of an example computer operable to engage in a system architecture that facilitates secure wireless communication according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    receiving, by network equipment comprising a processor, policy data representative of a policy associated with a network;
    receiving, by the network equipment from a user equipment, state data representative of a state of the user equipment;
    as a function of the policy data and the state data, generating, by the equipment, a trigger condition to trigger functionality associated with a microservice, wherein the trigger condition is a function of a service level agreement to be applied to the user equipment; and
    subsequent to generating the trigger condition, determining, by the network equipment, that the trigger condition has been satisfied.

2. The method of claim 1, wherein the trigger condition is a function of a type of service to be applied to the user equipment.

3. The method of claim 2, further comprising:
    in response to determining that the trigger condition has been satisfied, establishing, by the network equipment, a priority associated with the type of the service.

4. The method of claim 1, further comprising:
    in response to the microservice being determined to haven been distributed, receiving, by the network equipment, feedback data representative of an efficacy of the microservice according to a defined efficacy criterion.

5. The method of claim 1, wherein the trigger condition is a function of a location of the user equipment in relation to the network equipment.

6. The method of claim 5, further comprising:
    in response to the trigger condition being determined to have been satisfied, applying, by the network equipment, the microservice to the user equipment to facilitate a uniform distribution of the microservice.

7. The method of claim 6, wherein the uniform distribution of the microservice reduces a network traffic parameter value from a first parameter value to a second parameter value less than the first parameter value.

8. A system, comprising:
    a processor; and
    a memory that stores executable instructions that, when executed by the processor, facilitate performance of operations, comprising:
        receiving, from network equipment, policy data representative of a policy;
        receiving, from a user equipment associated with a network comprising the network equipment, state data representative of a state of the user equipment;
        based on the policy data and the state data, generating a trigger condition to trigger an action associated with applying a microservice to the user equipment, wherein the trigger condition is a function of a service level agreement to be applied to the user equipment; and
        in response to generating the trigger condition, determining that the trigger condition has been satisfied.

9. The system of claim 8, wherein the operations further comprise:
    in response to determining that the trigger condition has been satisfied, determining a sequence for the microservice to be applied to the user equipment.

10. The system of claim 8, wherein the operations further comprise:
    receiving load data representative of a load associated with the network.

11. The system of claim 10, wherein the operations further comprise:
    in response to receiving the load data, performing the applying of the microservice to the user equipment to reduce the load associated with the network.

12. The system of claim 8, wherein the operations further comprise:
    in response to receiving the policy data, modifying the action associated with distributing the microservice, resulting in a modified action.

13. The system of claim 12, wherein the operations further comprise:

in response to modifying the action, receiving performance data representative of a performance of the modified action.

14. The system of claim 13, wherein the performance data indicates that the modified action has been determined to have increased an efficiency associated with the network.

15. A non-transitory machine-readable storage medium, comprising executable instructions that, when executed by a processor, facilitate performance of operations, comprising:

receiving policy data representative of a service level agreement associated with a network;

receiving, from a mobile device, state data representative of a current state of the mobile device;

in response to receiving the policy data and the state data, generating threshold data representative of a threshold associated with a distribution of a microservice, wherein the threshold data is a function of the service level agreement, and wherein the service level agreement is to be applied to the mobile device;

in response to generating the threshold data, determining that the threshold has been satisfied; and in response to determining that the threshold has been satisfied, distributing the microservice to the mobile device.

16. The non-transitory machine-readable storage medium of claim 15, wherein the mobile device is a first mobile device, and wherein the operations further comprise:

based on a location of the first mobile device, distributing the microservice to a second mobile device, resulting in a distributed microservice.

17. The non-transitory machine-readable storage medium of claim 16, wherein the operations further comprise:

receiving feedback data representative of an efficacy of the distributed microservice according to a defined criterion.

18. The non-transitory machine-readable storage medium of claim 17, wherein the operations further comprise:

in response to receiving the feedback data, transmitting the feedback data to a third mobile device.

19. The non-transitory machine-readable storage medium of claim 18, wherein receiving the policy data comprises receiving the policy data from the third mobile device.

20. The non-transitory machine-readable storage medium of claim 19, wherein the policy data is first policy data, wherein the service level agreement is a first service level agreement, and wherein the operations further comprise:

in response to transmitting the feedback data to the third mobile device receiving second policy data representative of a second service level agreement different than the first service level agreement.

* * * * *